(12) United States Patent
Mukai et al.

(10) Patent No.: US 9,945,360 B2
(45) Date of Patent: Apr. 17, 2018

(54) RADIAL PISTON PUMP AND WIND POWER GENERATOR

(71) Applicant: Hitachi, Ltd., Chiyoda-ku, Tokyo (JP)

(72) Inventors: Hiroshi Mukai, Tokyo (JP); Norihito Kobata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 310 days.

(21) Appl. No.: 14/729,796

(22) Filed: Jun. 3, 2015

(65) Prior Publication Data

US 2015/0354537 A1  Dec. 10, 2015

(30) Foreign Application Priority Data

Jun. 4, 2014  (JP) ................................. 2014-115379

(51) Int. Cl.
  *F16D 31/02*  (2006.01)
  *F03D 9/28*  (2016.01)
  (Continued)

(52) U.S. Cl.
  CPC ............... *F03D 9/28* (2016.05); *F03D 15/20* (2016.05); *F04B 1/047* (2013.01); *F04B 1/053* (2013.01);
  (Continued)

(58) Field of Classification Search
  CPC ........ F04B 1/047; F04B 1/053; F04B 1/0538; F04B 1/1071; F04B 1/1133; F04B 3/00; Y02E 10/72
  See application file for complete search history.

(56) References Cited

U.S. PATENT DOCUMENTS 7,484,939 B2 * 2/2009 Hansen ................. F04B 1/1071
  417/218
8,128,386 B2 * 3/2012 Veilleux, Jr. .............. F04B 1/07
  417/220
(Continued)

FOREIGN PATENT DOCUMENTS

JP    47-36209       11/1972
JP    2011-524949 A   9/2011
JP    2012-522175 A   9/2012

OTHER PUBLICATIONS

Japanese-language Office Action issued in counterpart Japanese Application No. 2014-115379 dated Oct. 5, 2017 with English translation (Six (6) pages).

*Primary Examiner* — Michael Leslie
(74) *Attorney, Agent, or Firm* — Crowell & Moring LLP

(57) ABSTRACT

To provide a radial piston pump capable of displacement control without using an electronic control valve. For achieving the above object, the radial piston pump includes: a first cam circumferentially varying in radius on an inner circumferential side or outer circumferential side of the cam in a continuous manner; a second cam circumferentially varying in radius on an inner circumferential side or outer circumferential side of the cam in a continuous manner; a first operation member operating along a side of the first cam on which the radius of the cam continuously varies; a second operation member operating along a side of the second cam on which the radius of the cam continuously varies; a first piston connected to the first operation member; a second piston connected to the second operation member; a cylinder connecting with the first piston and the second piston and varied in volume by motion of at least one of the first piston and the second piston; and an adjustment unit for rotating at least one of the first cam and the second cam.

6 Claims, 8 Drawing Sheets

(51) Int. Cl.
  *F04B 1/053* (2006.01)
  *F04B 1/047* (2006.01)
  *F04B 1/107* (2006.01)
  *F04B 1/113* (2006.01)
  *F03D 15/20* (2016.01)

(52) U.S. Cl.
  CPC .......... *F04B 1/0538* (2013.01); *F04B 1/1071* (2013.01); *F04B 1/1133* (2013.01); *F05B 2260/406* (2013.01); *Y02E 10/721* (2013.01); *Y02P 80/158* (2015.11)

(56) References Cited

U.S. PATENT DOCUMENTS

| | | | |
|---|---|---|---|
| 9,003,954 B2* | 4/2015 | Salter | F04B 1/0538 92/72 |
| 2006/0222512 A1 | 10/2006 | Hansen | |
| 2011/0238092 A1 | 9/2011 | Vaz et al. | |
| 2012/0060685 A1 | 3/2012 | Salter et al. | |

* cited by examiner

RADIAL PISTON PUMP AND WIND POWER GENERATOR

BACKGROUND

The present invention relates to a radial piston pump and WIND POWER GENERATOR and more particularly, to displacement control of the radial piston pump.

A displacement control mechanism for radial piston pump has been set forth, for example, in Japanese Unexamined Patent Application Publication (Translation of PCT Application) No. 2011-524959. The following is described in this patent publication. "A fluid working machine includes a controller 12 and a working chamber 2 of cyclically varying volume. The working chamber has both an electronically controllable primary low pressure valve 14 and a secondary low pressure port 22 associated with the working chamber, which are each openable and closable in phased relation to cycles of the working chamber volume so as to bring the working chamber into fluid communication with a low pressure manifold 16, 26. At least the primary low pressure valve is under an active control of the controller so that the controller can determine the net displacement of fluid by the working chamber on a cycle by cycle basis. The primary low pressure valve and the secondary low pressure port are operable to open at a time during a portion of at least some cycles of the working chamber volume so that the fluid is allowed to flow through both the primary low pressure valve and the secondary low pressure port at a time into or out of the working chamber. The primary low pressure valve may be closed under the active control of the controller after the lapse of a certain period of time from the closure of the secondary low pressure port."

SUMMARY

According to the above prior-art technique, the displacement is artificially controlled by returning to the low pressure side some or the all of the working fluid pressurized by a piston and delivered from a high pressure port. Therefore, each of the cylinders is provided with an electronic control valve which is on-off controlled in synchronism with the move-in/out motion of the piston such that the amount of fluid returned to the low pressure side is adjusted.

In a case where a transmission with a hydraulic pump is applied to a large wind power generator, a radial piston hydraulic pump suggested, for example, by Japanese Unexamined Patent Application Publication (Translation of PCT Application) No. 2012-522175 may be the best option from the viewpoint of energy conversion efficiency and of the whole weight. However, displacement control based on a swash plate angle commonly used by an axial piston hydraulic pump is not applicable to this pump. Therefore, the above-described artificial displacement variable control employing the electronic control valve has been used.

Although the displacement control is accomplished by employing the electronic control valve, the pump is encumbered with problems of resistance to electrical noises and tolerances to ambient temperatures and humidity environment, namely the decrease in robustness which is the feature of the hydraulic machines. There is another problem of increased costs of dozens to more than hundred electronic control valves (initial cost and running cost associated with electric power consumption).

An object of the present invention is to provide a radial piston pump capable of providing displacement control without using the electronic control valve and a wind power generator which comprises the radial piston pump.

For achieving the above object, the present invention adopts structures described in the appended claims. The present application includes a plurality of units for achieving the above object, an example of which includes: a first cam circumferentially varying in radius on an inner circumference side or outer circumferential side of the cam in a continuous manner; a second cam circumferentially varying in radius on an inner circumference side or outer circumferential side of the cam in a continuous manner; a first operation member operating along a side of the first cam on which the radius of the cam continuously varies; a second operation member operating along a side of the second cam on which the radius of the cam continuously varies; a first piston connected to the first operation member; a second piston connected to the second operation member; a cylinder connecting with the first piston and the second piston and varied in volume by motion of at least one of the first piston and the second piston; and an adjustment unit for rotating at least one of the first cam and the second cam. Also, the present invention comprises a blade rotated by a wind; a generator which generates electricity; and the radial piston pump according to claim 1, wherein the radial piston pump transmits rotational energy of the blade to the generator.

According to the present invention, a radial piston pump capable of providing displacement control without using an electronic control valve and a wind power generator which comprises the radial piston pump can be provided.

DETAILED DESCRIPTION

Preferred embodiments for carrying out the present invention will hereinbelow be described with reference to the accompanying drawings. The details will be described in the individual embodiments. In any embodiment, a first operation member such as a roller and piston operates to cyclically increase and decrease the volume of a fluid chamber (cylinder) by following the radius change of a cam 1 which circumferentially varies in radius on an inner circumferential side or outer circumferential side of the cam in a continuous manner (varies in radius according to a circumferential position thereof). Similarly, a second operation member, such as a second roller and second piston, operates to cyclically increase and decrease the volume of the fluid chamber (cylinder) by following the radius change of a cam 2 which circumferentially varies in radius on an inner circumferential side or outer circumferential side in a continuous manner (varies in radius according to a circumferential position thereof). This fluid chamber (cylinder) may be adapted to singularly serve two cams. Alternatively, the fluid chamber may be provided for each cam. In the case where the fluid chamber (cylinder) is adapted to singularly serve two cams, the fluid chamber is configured to be varied in volume by the operations of both of the first piston and the second piston. In the case where the fluid chamber is provided for each cam, the fluid chambers (cylinders) possess a passage communicated with both of the fluid chambers. The amount of working fluid flowing into or flowing out of the fluid chambers is the total of amounts of cylinder volume change made by the first operation members and the second operation members. Further, a (phase) adjustment unit varies the amount of radius change of the cam 1 and the cam 2 such that the radial positions of the cam are shifted to any positions from in-phase relation to out-of-phase relation. Thus, the amount of working fluid flowing out of or flowing into the fluid chambers can be continuously varied from zero to the maximum value. Specifically, the positional change is made in a manner that at least one of the first cam 1 and the second cam 2 is rotated to change relative positional relation between these cams.

This displacement control is advantageous in that the need for employing the electronic control valve is eliminated. Although the use of the electronic control valve can be eliminated by applying the present invention, the present invention does not totally exclude the use of the electronic control valve in combination with some elements.

First Embodiment

In this embodiment, a displacement control operation of the radial piston pump according to the present invention is described.

Figure 1:
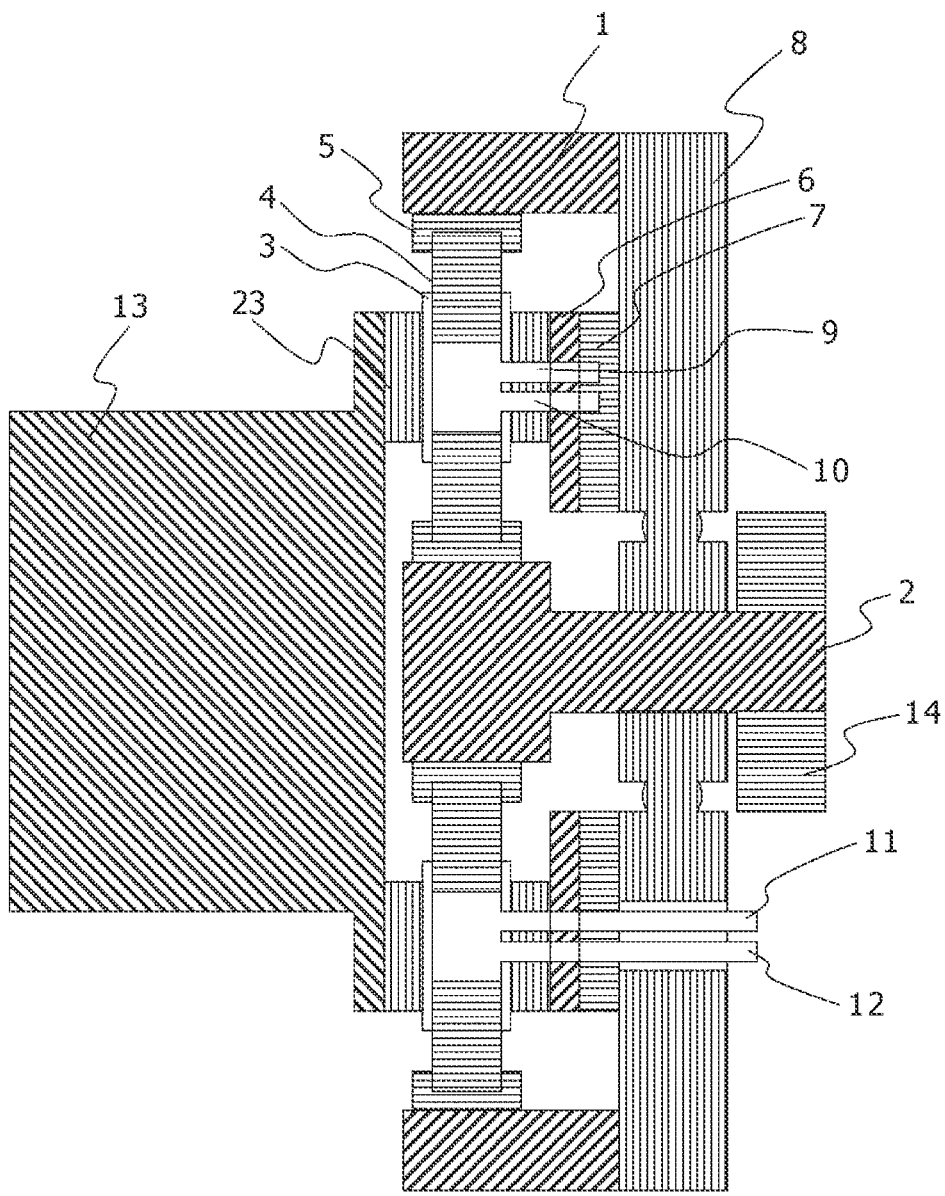
FIG. 1 is a sectional view of a pump according to a first embodiment of the present invention.
Figure 2:
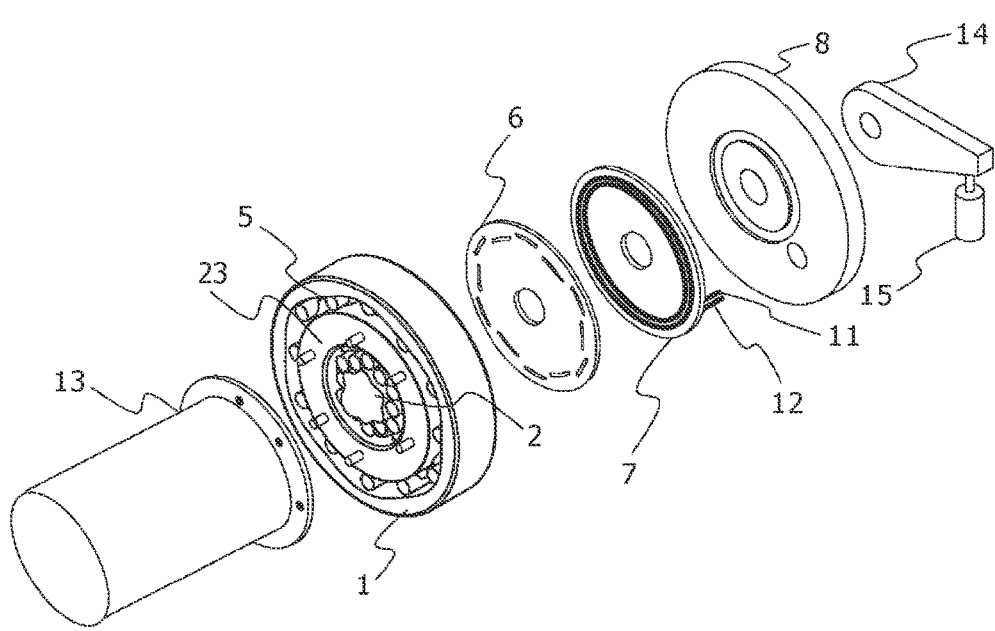
FIG. 2 is an exploded view of the pump according to the embodiment of the present invention.
Figure 3:
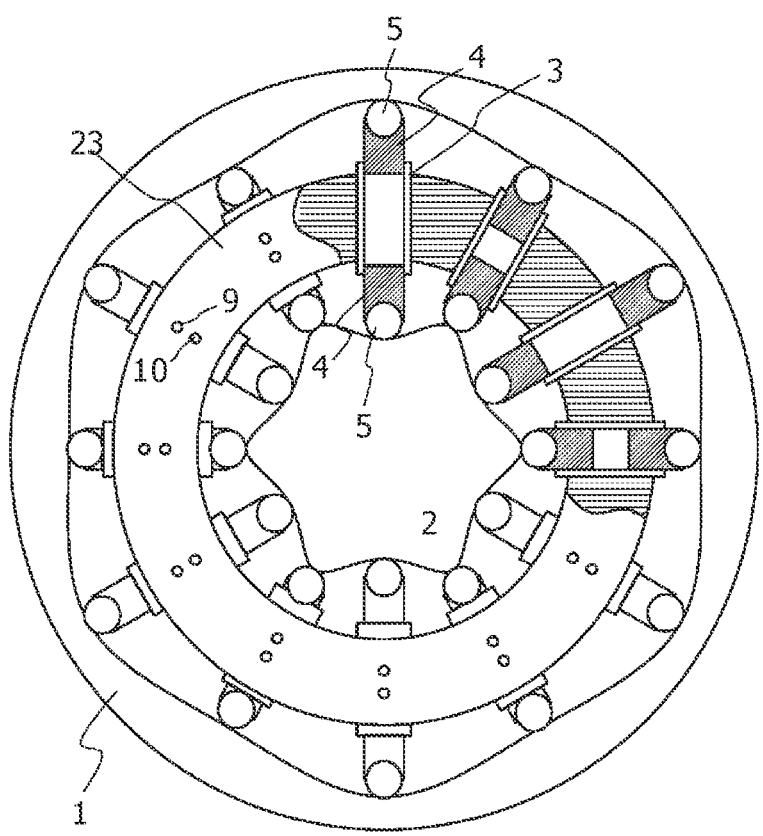
FIG. 3 is a fragmentary sectional view of a cylinder block of the pump according to the embodiment of the present invention.

FIG. 1 is a sectional view of the radial piston pump of the present invention. FIG. 2 is an exploded view of the radial piston pump of the present invention. FIG. 3 is a fragmentary sectional view of a cylinder block of the pump of the present invention. Numeral 1 denotes an outer cam ring. According to this embodiment, the outer cam ring has a configuration where the radius of the cam cyclically varies about a rotary shaft or varies in cycles of 60 degrees. A piston 4 is configured to receive a force applied by the cam ring via a roller 5 in a direction to drive the piston into a cylinder 3. Numeral 7 denotes a cylinder block which includes a group of 12 cylinders in this embodiment. Numeral 2 denotes a cam shaft which has the same configuration as that of the cam ring 1, where the radius of the cam varies about the rotary shaft in cycles of 60 degrees. Similarly to the cam ring 1, the cam shaft 2 is provided with the pistons 4 via the rollers 5. Rotational center axes of the cam ring 1 and the cam shaft 2 are the same (It is noted here that the term "the same" need not exactly mean that the axes are identical. Rather, what is needed is that the cam ring and the cam shaft have substantially equivalent rotational center axes. The description that the rotational center axes are approximately the same indicates more clearly that these axes are substantially the same. However, a phrase without the word "approximately" also means substantially the same axis. The same will apply hereinafter.) According to this embodiment, the cam shaft 2 is disposed on the rotational center axis while the cam ring 1 is disposed on an outer side of the cam shaft 2.

According to this embodiment, the cylinder block 23 rotates in a circumferential direction and accordingly, the cam varies in the radius so as to drive the pistons 4 to move in and out relative to the cylinders 3. Numeral 9 denotes an inlet port to the cylinder block while numeral 10 denotes an outlet port from the cylinder block. Numeral 6 denotes a valve plate including a plurality of through-holes. The valve plate 6 is fixed to the cam so as to open and close the ports 9, 10 of the cylinder block 23 for controlling the inflow and outflow when the ports 9, 10 of the cylinder block pass the through-holes. Numeral 7 denotes a passage plate which connects, via the valve plate, the inlet ports 9 and outlet ports 10 to an annular passage formed therein 7 and to an outlet passage 11 and an inlet passage 12. Numeral 8 denotes a bearing. According to this embodiment, the bearing 8 is configured to support the cam ring 1 and the cam shaft 2 in a manner to permit the phase angle adjustment of the cam ring 1 and the cam shaft 2. Numeral 14 denotes a phase angle changing arm. Numeral 15 denotes a phase angle control unit, which includes an actuator, such as a hydraulic cylinder, and a phase angle detection unit, and has a function to adjust and fix a phase difference between waves formed at the cam ring 1 and the cam shaft 2 to any given value. Numeral 13 denotes a main shaft which acts to rotate the cylinder block 23 by transmitting external rotational energy of, for example, a rotor of a wind turbine to the cylinder block. Actually, a bearing of the main shaft, a seal structure of a sliding part are indispensable but the description thereof is omitted in this embodiment.

The radial piston pump, which has the above-described structure, operates as follows. The main shaft 13 rotates to bring the cylinder block into rotation while the pistons 4 are driven into the cylinders 3 at a region where the radius of the cam ring 1 decreases. Thus, the fluid chambers are reduced in volume so that the working fluid is delivered from the outlet ports 10. Conversely, when the cam ring is increased in the radius, the working fluid is sucked in through the inlet ports 9. On the other hand, the cam shaft 2 also acts on the pistons the same way.

According to this embodiment, two pistons are disposed for one cylinder and hence, the inlet flow to or the outlet flow from the cylinder is the sum of amounts of cylinder volume changes caused by the movement of the two pistons 4. The delivery from the cylinder increases if the piston 4 on the inner circumferential side and the piston 4 on the outer circumferential side are simultaneously inserted in the cylinder. Conversely, the delivery from the cylinder decreases if with one of the pistons inserted in the cylinder, the other piston is driven out.

Figure 4:
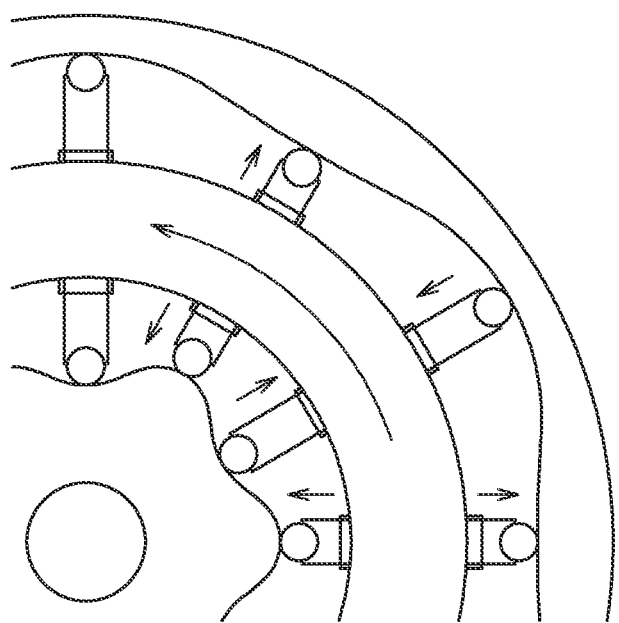
FIG. 4 is an explanatory diagram of the operation of the pump according to the embodiment of the present invention (delivery 100%)
Figure 5:
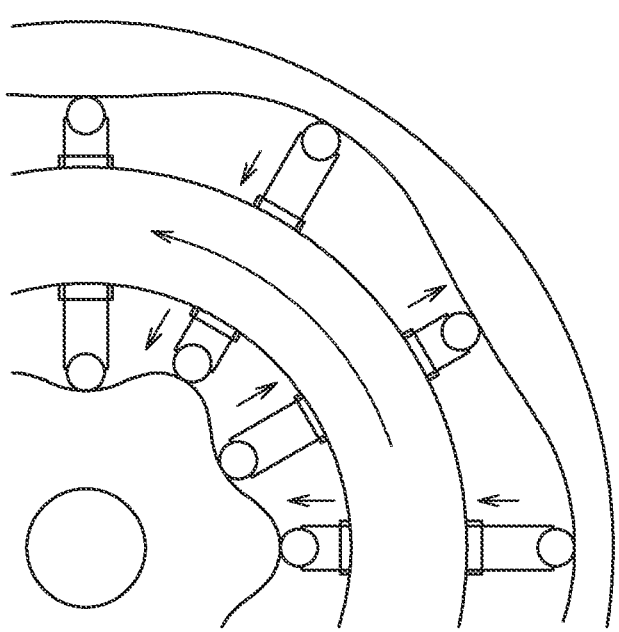
FIG. 5 is an explanatory diagram of the operation of the pump according to the embodiment of the present invention (delivery 50%)

FIG. 4 and FIG. 5 are diagrams explanatory of the above-described operations. FIG. 4 illustrates a case where the phase of the wave of the cam ring 1 is inverted from the phase of the wave of the cam shaft 2. In this case, the two pistons on the outer and inner circumferential sides move into and out from the cylinder in synchronism and hence, the difference between the maximum cylinder volume and the minimum cylinder volume is the largest. Therefore, the delivery from the cylinder increases. On the other hand, FIG. 5 illustrates a case where the phase of the wave of the cam ring 1 is the same as the phase of the wave of the cam shaft 2. In this case, when one of the pistons is inserted in the cylinder, the other piston is driven out of the cylinder and hence, the difference between the maximum cylinder volume and the minimum cylinder volume is the smallest. Therefore, the delivery from the cylinder decreases.

Figure 6:
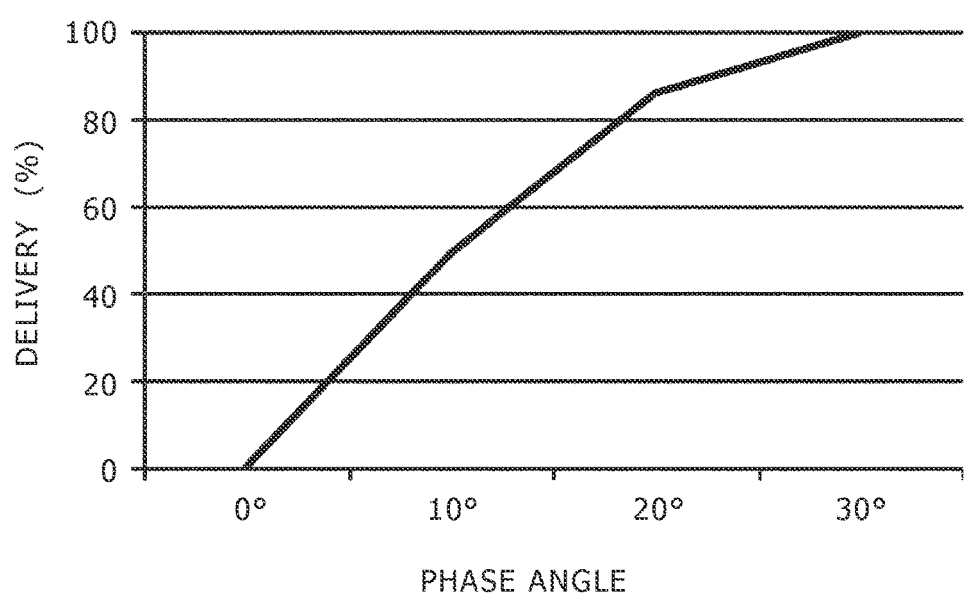
FIG. 6 is a graph showing a characteristic curve of delivery control of the pump according to the embodiment of the present invention.

FIG. 6 shows the results of calculation of the delivery against the phase angle. According to this embodiment, the outlet flow is 0% when the waves (convex/concave) of the cam shaft 1 (the cam on the inner circumferential side) and the cam ring 2 (the cam on the outer circumferential side) coincide with each other, namely a phase difference is 0°. The outlet flow is 100% when a phase difference is 30°. Since one cycle is 60° as described above, a phase difference of 30° is equivalent to a case where the waves (convex/concave) of the cam shaft 1 (the cam on the inner circumferential side) and the cam ring 2 (the cam on the outer circumferential side) are shifted from each other by a half cycle. The outlet flow of 0% when the waves (convex/concave) of the cam shaft 1 (the cam on the inner circumferential side) and the cam ring 2 (the cam on the outer circumferential side) coincide with each other is equivalent to a case where although the pistons 4 move, they merely make parallel movement in the radial direction while keeping a constant distance therebetween. Hence, the volume of the cylinder 3 does not change. The outlet flow of 100% is equivalent to a case where the outside piston 4 moves toward the inside in conjunction with the inside piston 4 moving toward the outside, and the outside piston 4 moves toward the outside in conjunction with the inside piston 4 moving toward the inside. That is, the inside piston 4 and the outside piston 4 perform compression and expansion in synchronism.

As described above, the radial piston pump of the embodiment does not employ the electronic control valve but relies on only a mechanism for continuously varying the delivery from 0% to 100%.

Figure 7:
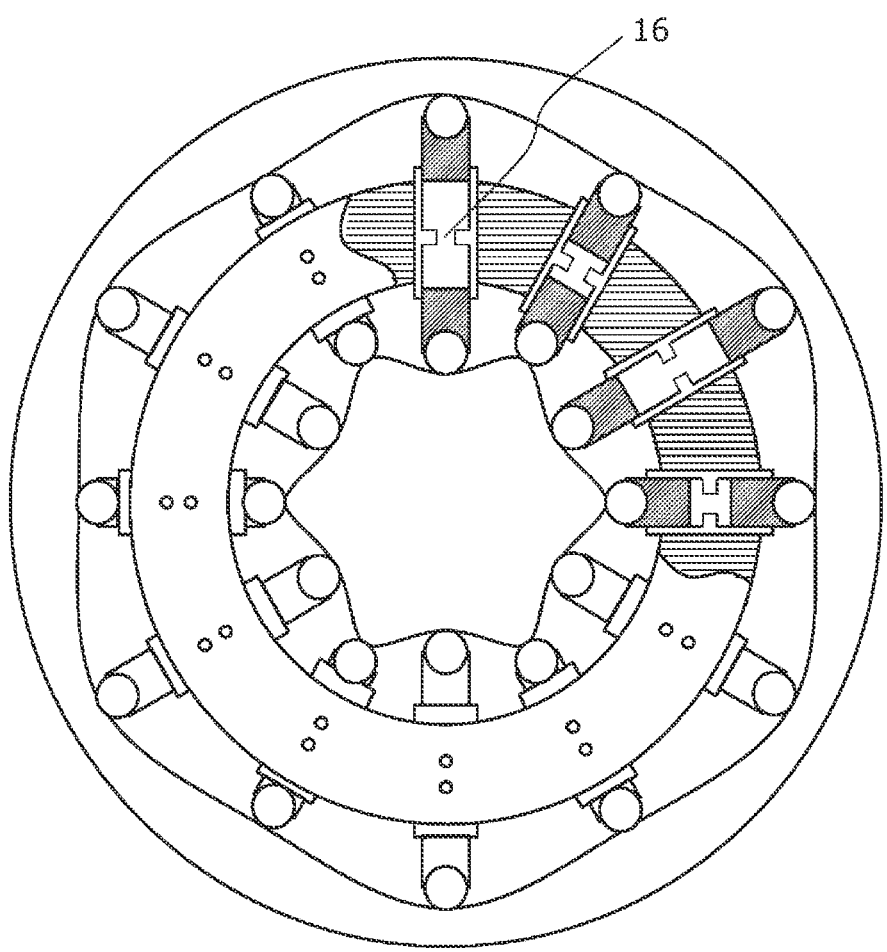
FIG. 7 is a fragmentary sectional view of the cylinder block of the pump according to the embodiment of the present invention.
Figure 8:
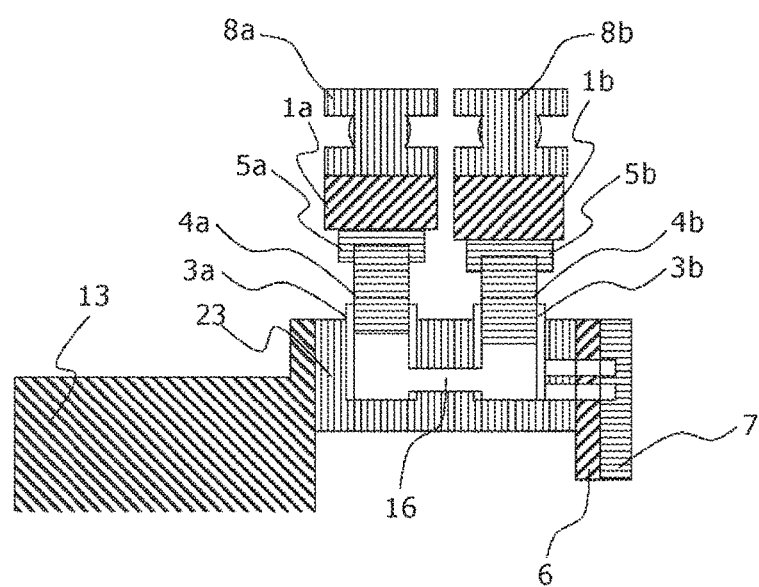
FIG. 8 is a sectional view of a pump according to a second embodiment of the present invention.

The embodiment employs the structure where one cylinder is provided with two pistons. As shown in FIG. 7, however, an alternative structure may also be employed where the cylinder is disposed for each piston and the cylinders are interconnected by means of a cylinder Second Embodiment While the first embodiment implements the displacement control by way of the phase difference between the cam ring 1 and the cam shaft 2, this embodiment features displacement control by way of phase difference between two cam rings 1a, 1b. The two cam rings 1a, 1b are shifted from each other in a direction of the rotary shaft. Bearings 8a, 8b are mounted on outer circumferential sides of the cam rings, respectively, so as to permit the respective cam rings to rotate independently. It is also possible to employ three or more cam rings in a case where the displacement control is provided based on the phase difference among plural cams arranged in the direction of the rotary shaft.

This embodiment has a structure which includes respective pairs of cam rings 1a, 1b, cylinders 3a, 3b, pistons 4a, 4b, rollers 5a, 5b and bearings 8a, 8b supporting the cam rings from the outer sides of the cam rings and where the cylinders 3a, 3b adjoining in the direction of the rotary shaft are interconnected by means of the passage 16.

While the cylinder pairs radially communicated with each other (single bodies per se) are arranged in the first embodiment, the cylinders communicated with each other in the direction of the rotary shaft are arranged in this embodiment. Similarly to the first embodiment, this embodiment, the detailed description of which is omitted, is capable of regulating the delivery from the cylinder block 23 between 0% and 100% by adjusting the phase difference between the cam ring 1a and the cam ring 1b.

Figure 9:
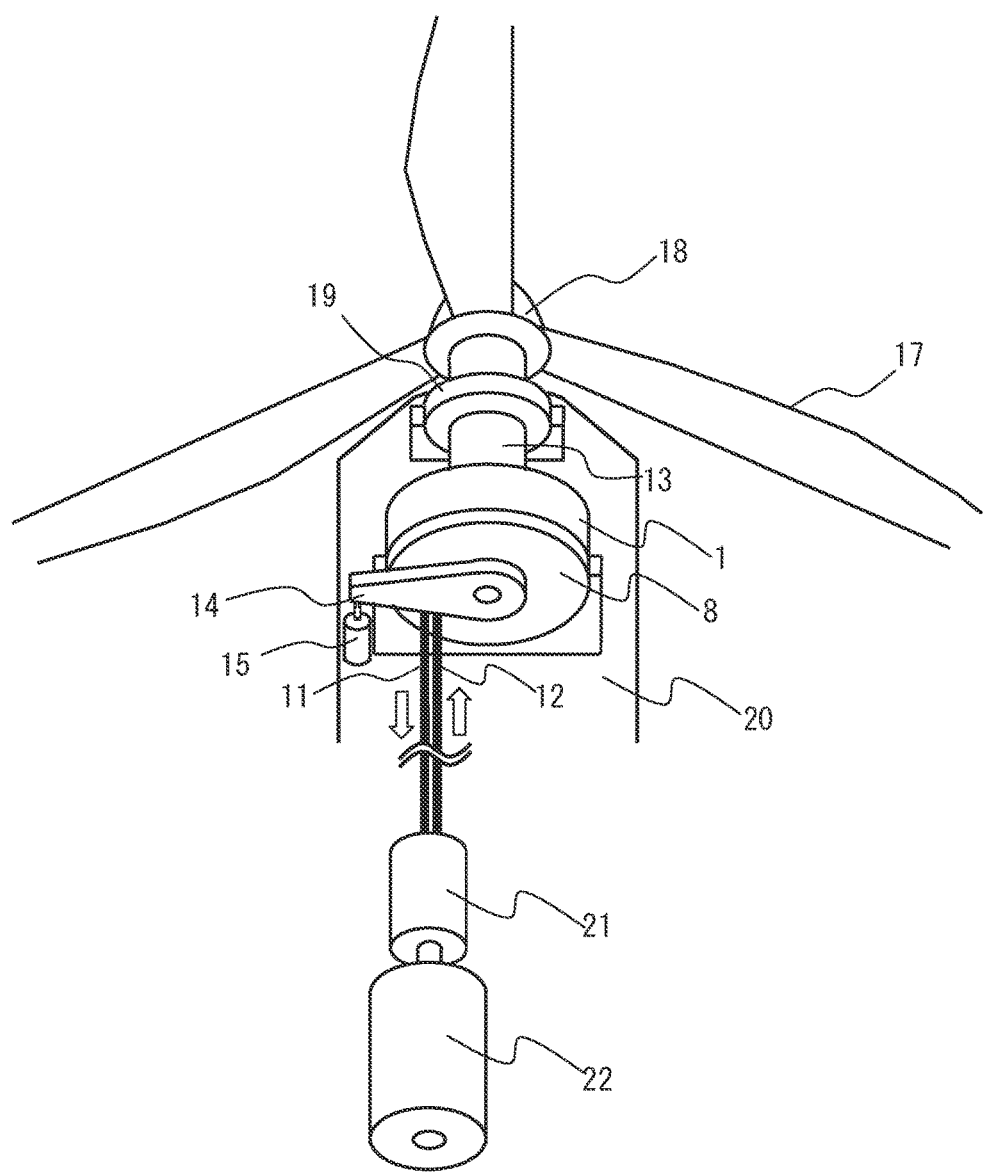
FIG. 9 is a perspective view of a power generator according to a third embodiment of the present invention.

FIG. 9 shows a perspective view of a third embodiment of the invention. In this embodiment, an example of an electric power generation system is shown and the radial piston pump in the first embodiment is adopted to the power generation system. The power generation system in this embodiment generates electric power using external force including wind or hydraulic power, i.e. ocean flow, tidal stream. Blades 17 rotate based on the hydroscopic energy from wind or hydraulic power. A hub 18 supports the blade 17 and transmits a force acted on the blades to a main shaft 13. A bearing 19 supports the main shaft 13. A mount 20 supports the axis 19 and the radial piston pump. A hydraulic motor 21 converts hydraulic energy of hydraulic oil into rotational energy. A generator 20 converts the rotational energy into electrical energy.

Based on the above described feature, the external power is converted into rotational energy of the main axis 13 through the rotation of the blades, and drives the radial piston pump. Then, the oil pressured by the pump drives the motor 21 by way of a pipe, and the generator generates electricity using the rotational energy of the motor 21. Therefore, in this embodiment, the pump works for transmitting the rotational energy of the blades 17 to the generator 20.

Because the pump and the motor 21 are connected by way of the pipe, the motor 21 and the generator 22 can be disposed at any position by changing the pipe arrangement. That is, for example in case of a wind power generator, it is possible to position the motor 21 and the generator 22 not only inside a nacelle, but also at the bottom of a tower of the wind power generator depending on the pipe arrangement.

What is claimed is:

1. A radial piston pump comprising:
    a first cam circumferentially varying in radius on an inner circumference side or outer circumferential side of the cam in a continuous manner;
    a second cam circumferentially varying in radius on an inner circumference side or outer circumferential side of the cam in a continuous manner;
    a first operation member operating along a side of the first cam on which the radius of the cam continuously varies;
    a second operation member operating along a side of the second cam on which the radius of the cam continuously varies;
    a first piston connected to the first operation member;
    a second piston connected to the second operation member;
    a cylinder connecting with the first piston and the second piston and varied in volume by motion of at least one of the first piston and the second piston; and
    an adjustment unit for rotating at least one of the first cam and the second cam, wherein
    the second cam is disposed on the outer circumferential side of the first cam.

2. The radial piston pump according to claim 1, wherein rotational center axes of the first cam and the second cam are approximately the same.

3. The radial piston pump according to claim 1, wherein the cylinder is provided for each of the pistons and the two cylinders possess a passage communicated with the cylinders.

4. The radial piston pump according to claim 1, wherein the cylinder is a single body and is varied in volume by the motion of both of the pistons.

5. The radial piston pump according to claim 1, further comprising a bearing disposed between the first cam and the second cam.

6. A wind power generator comprising:
a blade rotated by a wind;
a generator which generates electricity; and
the radial piston pump according to claim 1,
    wherein the radial piston pump transmits rotational energy of the blade to the generator.

* * * * *